US010166662B2

(12) United States Patent
Rourke et al.

(10) Patent No.: US 10,166,662 B2
(45) Date of Patent: Jan. 1, 2019

(54) HOSE CLAMP SUPPORT TOOL

(71) Applicant: GM GLOBAL TECHNOLOGY OPERATIONS LLC, Detroit, MI (US)

(72) Inventors: Rick F. Rourke, Metamora, MI (US); Senan A. Karmo, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 658 days.

(21) Appl. No.: 14/690,869

(22) Filed: Apr. 20, 2015

(65) Prior Publication Data

US 2016/0303718 A1 Oct. 20, 2016

(51) Int. Cl.
*B25B 25/00* (2006.01)
*F16L 3/12* (2006.01)
*F16L 3/137* (2006.01)

(52) U.S. Cl.
CPC .................................. *B25B 25/005* (2013.01)

(58) Field of Classification Search
CPC .................................................... B25B 25/005
USPC .......... 81/9.3, 55, 180.1, 449, 450, 455, 457
See application file for complete search history.

(56) References Cited

U.S. PATENT DOCUMENTS 3,965,950 A * 6/1976 MacDonald ............ B25B 23/10 81/455
4,358,971 A * 11/1982 Favonio ................... A61C 3/06 81/55
5,207,127 A * 5/1993 Nick ....................... B25B 23/10 81/429
6,164,162 A * 12/2000 Furundzic ............ B25B 25/005 29/229
7,637,182 B1 12/2009 Long
8,408,097 B2 * 4/2013 Grohmann ............ B25B 23/141 81/429
2003/0033909 A1 * 2/2003 Gore ....................... B25B 13/48 81/9.3
2007/0169588 A1 7/2007 Chen
2007/0227309 A1 10/2007 Teeters

FOREIGN PATENT DOCUMENTS

CN 1431945 A 7/2003
DE 2622650 A1 12/1977
DE 8709972 U1 9/1987
DE 20209925 U1 10/2002
GB 793378 A 4/1958

* cited by examiner

*Primary Examiner* — Hadi Shakeri
(74) *Attorney, Agent, or Firm* — Quinn IP Law

(57) ABSTRACT

A hose clamp support tool includes a collar that is attached to a nose of a rotational driver. A drive extension includes a driven socket end that is connected to a drive output of the rotational driver, and a screw socket end that engages a screw of a hose clamp. A support structure is coupled to the collar, and is slideably moveable relative to the drive extension along the central drive axis. The support structure includes a cylindrical portion. The drive extension extends through and is rotatably supported by the cylindrical portion. The support structure includes a hood. The hose clamp is secured between the hood and the screw socket end of the drive extension during installation and removal operations. A biasing device is operable to bias the support structure along the central drive axis relative to the drive extension.

13 Claims, 2 Drawing Sheets

HOSE CLAMP SUPPORT TOOL

TECHNICAL FIELD

The disclosure generally relates to a hose clamp support tool for supporting a hose clamp during installation and/or removal operations.

BACKGROUND

A hose clamp is used to attach a hose onto a fitting. One particular common and inexpensive style of hose clamp is a screw/band (worm gear) hose clamp. A screw/band hose clamp includes a band that includes a screw thread pattern cut or pressed into it. A screw end of the band includes a captive screw attached to the band. The other, loose end of the band is fed into a narrow space between the band and the captive screw. When the screw is turned, the threads on the screw act as a worm drive pulling or pushing against the threads of the band, causing the band to tighten or loosen around the hose respectively.

Turning the captive screw requires that a certain amount of force be applied to the screw to maintain a positive connection between a rotational driver and the head of the screw. However, this force often causes the screw/band hose clamp to rotate around the hose, which can lead to the head of the screw rotating into an inaccessible position. In order to prevent the screw/band hose clamp from rotating while tightening and/or loosening the hose clamp, an operator may manually hold onto the hose clamp, or the hose clamp may be mechanically fixed or bonded to the hose to prevent the hose clamp from rotating relative to the hose. The hose clamp may be located in a position that prevents manually holding the hose clamp, and attaching the hose clamp to the hose increases manufacturing cost and complexity.

SUMMARY

A hose clamp support tool is provided. The hose clamp support tool includes a collar that is configured for attachment to a nose of a rotational driver. A support structure is coupled to the collar. The support structure is slideably moveable relative to the collar along a central drive axis. A drive extension is rotatably supported by the support structure for rotation about the central drive axis. The support structure is slideably moveable relative to the drive extension along the central drive axis. The drive extension includes a driven socket end that is configured for attachment to a drive output of the rotational driver. The drive extension further includes a screw socket end that is configured for engaging a head of a screw of a hose clamp. The support structure includes a hood that is configured for engaging the hose clamp, such that the hose clamp is secured between the hood of the support structure and the screw socket end of the drive extension during installation and removal operations.

In another configuration, the hose clamp support tool includes a rotational driver having a drive output that extends from a nose along a central drive axis. A collar is attached to the nose of the rotational driver. The collar includes an annular flange portion that is concentric with the central drive axis. The annular flange portion defines a plurality of apertures that are angularly spaced about the central drive axis relative to each other, and that extending through the annular flange portion along the central drive axis. A drive extension includes a driven socket end that is connected to the drive output of the rotational driver, and a screw socket end that is configured for engaging a head of a screw of a hose clamp. A support structure is slideably moveable relative to the drive extension along the central drive axis. The support structure includes a positioning pin extending along the central drive axis that is slideably disposed within one of the plurality of apertures. The support structure includes a cylindrical portion having a central bore that is concentric with the central drive axis. The drive extension extends through the central bore of the cylindrical portion. The cylindrical portion rotatably supports the drive extension for rotation about the central drive axis. The support structure includes a hood disposed at a distal end of the support structure. The hood is operable to engage the hose clamp, such that the hose clamp is secured between the hood of the support structure and the screw socket end of the drive extension during installation and removal operations. A biasing device is operable to bias the support structure along the central drive axis relative to the drive extension, and toward the collar.

Accordingly, the hose clamp support tool is attached to or part of the rotational driver. The hose clamp support tool secures a hose clamp, such as a screw/band style of hose clamp, relative to the rotational driver. The rotational driver provides a rotational output capable of rotating a screw of the hose clamp. The hose clamp may be positioned between the hood and the screw socket end of the drive extension, with the screw socket end engaging a head of a screw of the hose clamp. The biasing device biases the support structure toward the collar and the rotational driver, thereby compressing the hose clamp between the hood and the screw socket end of the drive extension, and securing the hose clamp in place relative to the rotational driver. The rotational driver may then be actuated to rotate the screw to either tighten or loosen the hose clamp, without the hose clamp rotating relative to the rotational driver. Accordingly, a user does not need to manually hold the hose clamp in place while rotating the screw of the hose clamp, nor does the hose clamp need to be attached to the hose prior to tightening and/or loosening the hose clamp.

The above features and advantages and other features and advantages of the present teachings are readily apparent from the following detailed description of the best modes for carrying out the teachings when taken in connection with the accompanying drawings.

DETAILED DESCRIPTION

Figure 1:
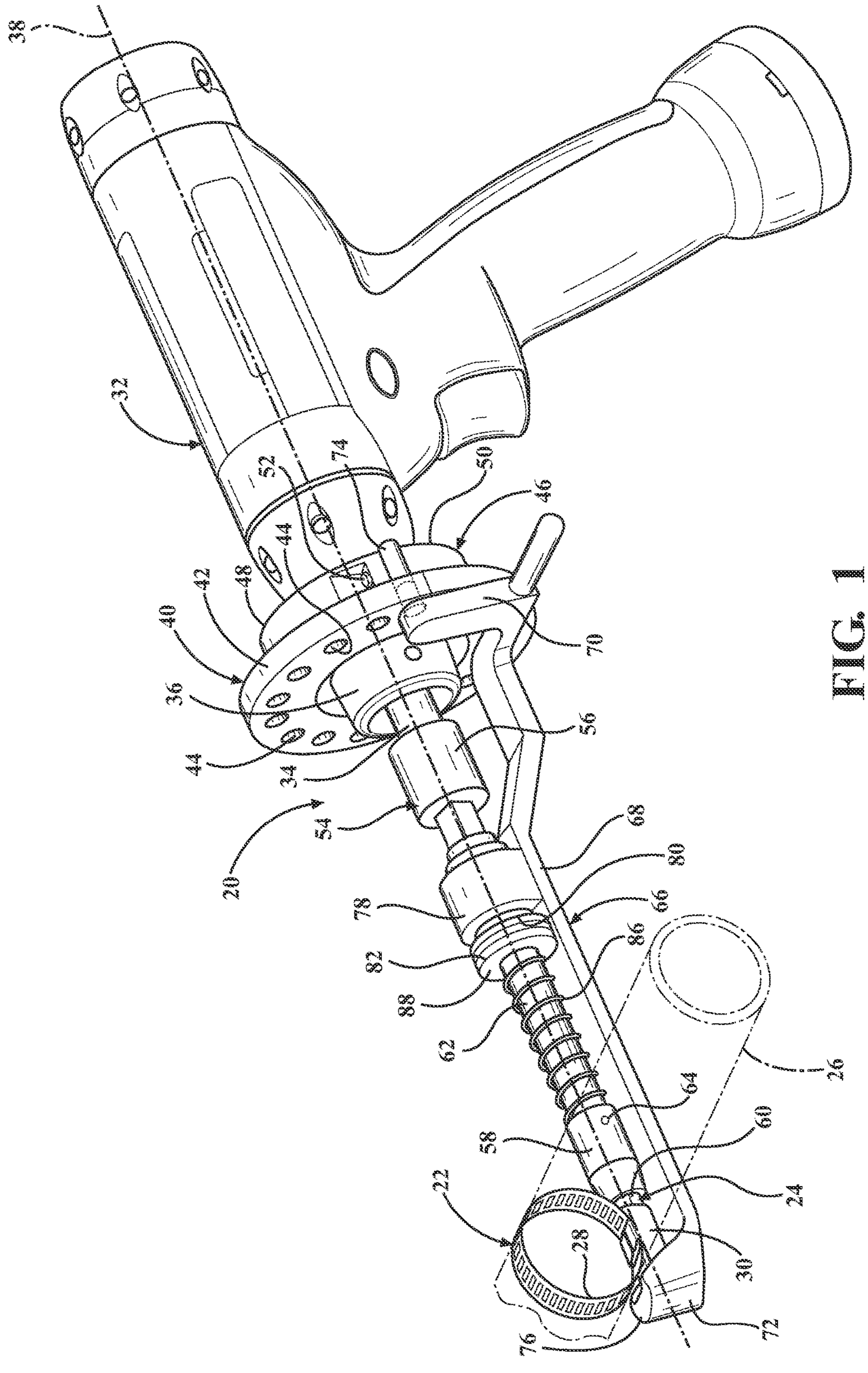
FIG. 1 is a schematic perspective view of a hose clamp support tool.
Figure 2:
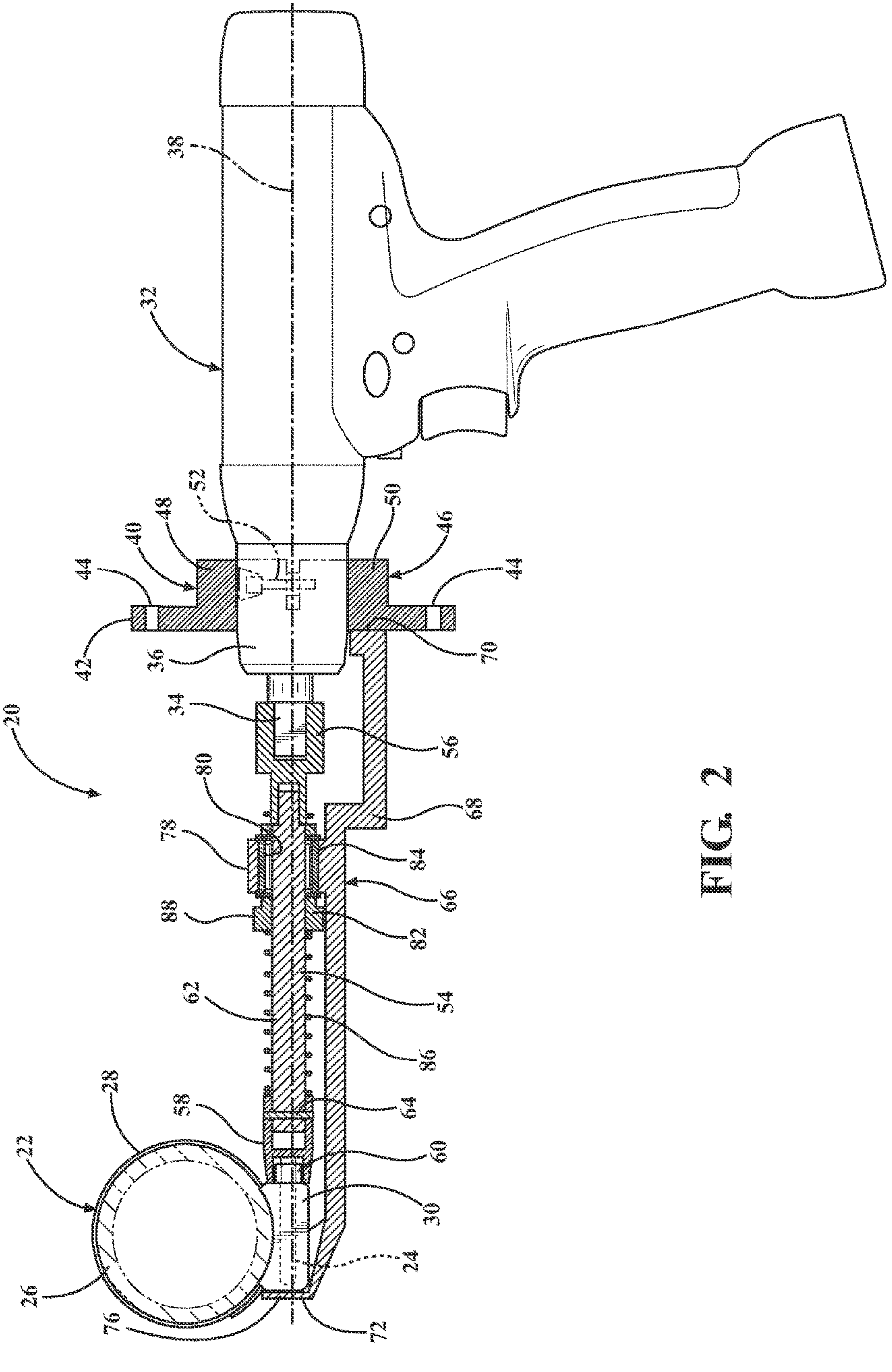
FIG. 2 is a schematic cross sectional view of the hose clamp support tool.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a hose clamp support tool is generally shown at 20. The hose clamp support tool 20 is used to secure a hose clamp 22 in position while tightening and/or loosening the hose clamp 22, to prevent a captive screw 24 of the hose clamp 22 from rotating around a hose 26 during the tightening and/or loosening operations. As shown, the hose clamp support tool 20 is configured for supporting a screw/band (worm gear) style of hose clamp 22. The screw/band style hose clamp 22 includes a band 28 that includes a screw thread pattern cut or pressed into it. A screw end of the band 28 includes the captive screw 24 attached to the band 28 by a housing 30. The other, loose end of the band 28 is fed into a narrow space between the band 28 and the captive screw 24. When the captive screw 24 is turned, the threads on the captive screw 24 act as a worm drive pulling or pushing against the threads of the band 28 to move the band 28 through the housing 30, causing the band 28 to tighten or loosen around the hose 26 respectively.

The hose clamp support tool 20 is attached to a rotational driver 32. The rotational driver 32 includes a drive output 34 that extends from a nose 36 of the rotational driver 32, along a central drive axis 38. The rotational driver 32 may include, for example, a nut driver commonly used in manufacturing facilities for rotating a nut, bolt, screw, etc., or may alternatively include a screw gun, impact wrench, or some other device capable for rotating an object. The rotational driver 32 may be powered in any suitable manner, such as but not limited to being electrically powered, pneumatically powered, or hydraulically powered. The drive output 34 may include, for example, a male square socket drive of any suitable size, such as ¼", ⅜", or ½". However, it should be appreciated that the drive output 34 may be configured in some other manner capable of transmitting rotation and torque. The drive output 34 is concentric with and rotated about the central drive axis 38 by a motor/gear system of the rotational driver 32, as is known in the art.

The hose clamp support tool 20 includes a collar 40 that is attached to the nose 36 of the rotational driver 32. The collar 40 includes an annular flange portion 42. Preferably, the annular flange portion 42 is concentric with the central drive axis 38. As shown, the annular flange portion 42 includes a generally planar structure that is positioned approximately perpendicular to the central drive axis 38, and extends radially away from the central drive axis 38. Additionally, the annular flange portion 42 extends completely around an exterior surface of the nose 36 of the rotational driver 32. However, it should be appreciated that the annular flange portion 42 may be configured differently than shown in the exemplary embodiment presented in the Figures and described herein, and need not extend completely around the nose 36. Additionally, the annular flange portion 42 may be comprised of more than one piece.

The annular flange portion 42 defines at least one aperture 44, and preferably a plurality of apertures 44. The apertures 44 are radially spaced from the central drive axis 38, and are angularly spaced about the central drive axis 38 relative to each other. The apertures 44 extend through the annular flange portion 42, generally parallel with and along the central drive axis 38. The function of the apertures 44 is described in greater detail below.

The collar 40, including the annular flange portion 42, may be integrally formed onto the nose 36 of the rotational driver 32. Alternatively, the annular flange portion 42 may be separate from the rotational driver 32, and fixedly attached to the nose 36 of the rotational driver 32. For example, and as shown in the Figures, the collar 40 may include a clamp portion 46 that is operable to clamp onto the nose 36 of the rotational driver 32. The clamp portion 46 and the annular flange portion 42 are connected together. Preferably, the clamp portion 46 and the annular flange portion 42 are a single manufacture. However, it should be appreciated that the clamp portion 46 and the annular flange portion 42 may be separate components that are attached together.

As shown, the clamp portion 46 includes an upper or first half 48 and a lower or second half 50. The first half 48 and the second half 50 are spaced from each other, and disposed on opposite sides of the nose 36 of the rotational driver 32. The first half 48 and the second half 50 of the clamp portion 46 are compressed together to grasp the nose 36 of the rotational driver 32 therebetween, and secure the annular flange portion 42 to the rotational driver 32. At least one fastener 52 may be used to connect the first half 48 and the second half 50 of the clamp portion 46. Preferably, two fasteners 52 are used, on opposing sides of the nose 36 of the rotational driver 32, to connect the first half 48 and the second half 50 of the clamp portion 46 together. The fasteners 52 may include, a bolt, screw, or other similar fastener that is capable of drawing the first half 48 and the second half 50 of the clamp portion 46 together to clamp the collar 40 to the nose 36 of the rotational driver 32, in order to prevent the collar 40 from rotating about the nose 36 of the rotational driver 32, or from moving axially along the central drive axis 38 relative to the rotational driver 32. It should be appreciated that the clamp portion 46 of the collar 40 may be configured differently than the exemplary embodiment shown in the Figures and described herein.

A drive extension 54 is attached to the drive output 34 of the rotational driver 32, and is concentric with the central drive axis 38. The drive extension 54 includes a driven socket end 56, and a screw socket end 58. The driven socket end 56 is connected to the drive output 34 of the rotational driver 32. The driven socket end 56 is driven, i.e., is rotated by, the drive output 34 of the rotational driver 32, to rotate the drive extension 54 about the central drive axis 38. The exact configuration of the driven socket end 56 depends upon the configuration of the drive output 34. For example, and as shown, if the drive output 34 includes a ¼" male socket drive, then the driven socket end 56 will include a corresponding ¼" female socket drive. The screw socket end 58 is configured for engaging a head 60 of the captive screw 24 of the hose clamp 22. The screw socket end 58 drives or rotates the captive screw 24 of the hose clamp 22, and is rotated by the driven socket end 56. The exact configuration of the screw socket end 58 depends upon the configuration of the head 60 of the captive screw 24 of the hose clamp 22. For example, if the head 60 of the captive screw 24 includes 5⁄16" male hexagonal head, then the screw socket end 58 will include a corresponding 5⁄16" female hexagonal socket.

The drive extension 54 includes a shank 62 that connects the driven socket end 56 and the screw socket end 58. The length of the shank 62 may vary depending upon the specific application or the size of the hose clamp 22. At least a portion of the shank 62 includes a cylindrical shape concentric with the central drive axis 38. The driven socket end 56 and the screw socket end 58 of the drive extension 54 may be integrally formed with the shank 62 portion as a single manufacture. Alternatively, the driven socket end 56 and/or the screw socket end 58 may be separate components attached to the shank 62. For example, and as shown, the driven socket end 56 is integrally formed with the shank 62, whereas the screw socket end 58 is formed separately from the shank 62, and is fixedly attached to the shank 62 of the drive extension 54. The screw socket end 58 may be attached to the shank 62 in any suitable manner. For example, the shank 62 may be formed with a standard ⅜" male socket drive, and the screw socket end 58 may include a standard ⅜" female drive socket attached to the shank 62. A roll pin 64 may be used to further secure the screw socket end 58 to the shank 62 to prevent the screw socket end 58 from dislodging from the shank 62.

A support structure 66 is coupled to the collar 40, and is supported by the drive extension 54. The support structure 66 is slideably moveable relative to the collar 40, along the central drive axis 38. The support structure 66 includes a beam portion 68 that extends from a first end 70 disposed adjacent the collar 40, generally along the central drive axis 38, to a distal end 72. The support structure 66 includes a positioning pin 74 disposed at the first end 70 of the support structure 66 adjacent the collar 40, and a hood 76 disposed at the distal end 72 of the support structure 66. The hood 76 engages and aligns the hose clamp 22 relative to the support structure 66. The positioning pin 74 aligns or orients the support structure 66 relative to the rotational driver 32.

The positioning pin 74 extends along the central drive axis 38, and is slideably disposed within one of the plurality of apertures 44. The positioning pin 74 may be slideably disposed within any one of the plurality of apertures 44 defined by the collar 40 to orient the hood 76 of the support structure 66 in a respective position relative to the rotational driver 32. Accordingly, each respective aperture 44 in the collar 40 is associated with a respective position of the hood 76. Because the collar 40 is fixed in position relative to the rotational driver 32, moving the positioning pin 74 between the different apertures 44, rotates the support structure 66 about the central drive axis 38, thereby changing the position and orientation of the hood 76 relative to the rotational driver 32. In so doing, the position of the hose clamp 22 relative to the rotational driver 32, which is determined by the position and/or orientation of the hood 76 relative to the rotational driver 32, may be changed without having to manipulate the orientation of the rotational driver 32.

The drive extension 54 is rotatably supported by the support structure 66 for rotation about the central drive axis 38. As shown, the support structure 66 includes a tubular or cylindrical portion 78 having a central bore 80. The central bore 80 is concentric with the central drive axis 38. The drive extension 54 extends through the central bore 80 of the cylindrical portion 78, with the cylindrical portion 78 rotatably supporting the drive extension 54 for rotation about the central drive axis 38.

Preferably, and as shown, the hose clamp support tool 20 includes a bushing 82 disposed within the central bore 80, between the drive extension 54 and an interior surface of the cylindrical portion 78. The bushing 82 rotatably supports the drive extension 54 relative to the cylindrical portion 78 of the support structure 66. The bushing 82 may include a bearing 84, such as for example, a needle bearing, to provide low friction rotational support of the drive extension 54. Alternatively, the bushing 82 may be constructed from a low friction material. The cylindrical portion 78 of the support structure 66 and the bushing 82 are slideably moveable over the drive extension 54, and along the central drive axis 38.

The hose clamp support tool 20 includes a biasing device 86 that is operable to bias the support structure 66 along the central drive axis 38 relative to the drive extension 54, and toward the collar 40. As shown in the exemplary embodiment, the biasing device 86 includes a coil spring disposed between and biasing against the screw socket end 58 of the drive extension 54, and the cylindrical portion 78 of the support structure 66. However, it should be appreciated that the biasing device 86 may be configured differently than the exemplary embodiment shown in the Figures and described herein. As shown, the bushing 82 includes a lip 88. The lip 88 of the bushing 82 is disposed between the screw socket end 58 of the drive extension 54 and the cylindrical portion 78 of the support structure 66. The lip 88 defines a radius that is larger than a radius of the central bore 80 of the cylindrical portion 78 of the support structure 66, such that the lip 88 may not pass through the central bore 80. The biasing device 86 is disposed between and biases against the screw socket end 58 of the drive extension 54 and the lip 88 of the bushing 82. Because the lip 88 is larger than the central bore 80 of the cylindrical portion 78, the biasing device 86 biases the lip 88 of the bushing 82 against the cylindrical portion 78 of the support structure 66, thereby biasing the support structure 66 against the screw socket end 58 of the drive extension 54.

A cover (not shown) may be included and disposed over the biasing device 86 to prevent objects from becoming entangled with the biasing device 86, and to prevent the metallic biasing device 86 from contacting any electrical components. Additionally any or all of the components of the hose clamp support tool 20 may be manufactured from or coated with a non-metallic material, having high electrical insulation properties, if the hose clamp support tool 20 is to be used near electrically sensitive or conductive components.

As noted above, the hood 76 is disposed at the distal end 72 of the support structure 66. The hood 76 engages the housing 30 of the hose clamp 22, which supports the captive screw 24 of the hose clamp 22, such that the hose clamp 22 is secured between the hood 76 and the screw socket end 58 of the drive extension 54 during installation and removal operations. In operation, the drive extension 54 only rotates about the central drive axis 38, and remains fixed in position along the central drive axis 38. In other words, the drive extension 54 does not move axially along the central drive axis 38 relative to the rotational driver 32 while tightening and/or loosening the hose clamp 22. In order to position the hose clamp 22 within the hose clamp support tool 20, the support structure 66 is moved axially along the central drive axis 38, away from the rotational driver 32 and the collar 40. The positioning pin 74 slides within its respective aperture 44 relative to the collar 40, and the cylindrical portion 78 of the support structure 66 slides over and relative to the drive extension 54. This movement of the support structure 66 relative to the drive extension 54 and away from the collar 40 increases the distance along the central drive axis 38 between the hood 76 and the screw socket end 58 of the drive extension 54. The support structure 66 is moved along the central drive axis 38 until the distance between the hood 76 and the screw socket end 58 of the drive extension 54 is sufficient to insert or remove the hose clamp 22 therebetween.

If the relative orientation of the hood 76 needs to be changed, then the support structure 66 is moved along the central drive axis 38 far enough to dislodge the positioning pin 74 from its current aperture 44, whereupon the support structure 66 may be rotated about the central drive axis 38, relative to the rotational driver 32, until the positioning pin 74 is aligned with a respective aperture 44 that positions the hood 76 in the proper orientation.

It should be appreciated that moving the support structure 66 relative to the drive extension 54 and away from the collar 40 compresses the biasing device 86. Upon the support structure 66 being released, the biasing device 86 biases the support structure 66 against the screw socket end

58 of the drive extension 54, thereby moving the support structure 66 along the central drive axis 38, toward the collar 40, until the screw socket end 58 is engaged with the head 60 of the captive screw 24, the hood 76 is engaged with the housing 30 supporting the captive screw 24, and the hose clamp 22 is secured between the hood 76 and the screw socket end 58 of the drive extension 54.

The rotational driver 32 may then be operated to rotate the drive extension 54, thereby either tightening or loosening the hose clamp 22 as required. The hose clamp 22 remains secured in position, between the hood 76 and the screw socket end 58 of the drive extension 54 as the drive extension 54 is rotated to turn the captive screw 24. The hose clamp 22 may be released by simply moving the support structure 66 along the central drive axis 38, away from the collar 40, to once again increase the distance between the hood 76 and the screw socket end 58 of the drive extension 54, until the hose clamp 22 is dislodged from the hood 76 and the head 60 of the captive screw 24 is dislodged from the screw socket end 58 of the drive extension 54.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A hose clamp support tool comprising:

a rotational driver having a nose and a drive output extending from the nose along a central drive axis;

a collar attached to the nose of the rotational driver and including an annular flange portion concentric with the central drive axis, wherein the annular flange portion defines a plurality of apertures angularly spaced about the central drive axis relative to each other, and extending through the annular flange portion along the central drive axis;

wherein the drive output of the rotational driver is rotatable about the central drive axis relative to the nose and the collar, and wherein the collar is not rotatable about the central drive axis relative to the nose of the rotational driver;

a drive extension including a driven socket end connected to the drive output of the rotational driver, and a screw socket end configured for engaging a head of a screw of a hose clamp;

a support structure directly supported by the collar and slideably moveable relative to the drive extension along the central drive axis, wherein the support structure includes a positioning pin extending along the central drive axis and slideably disposed within one of the plurality of apertures;

wherein the support structure includes a cylindrical portion having a central bore concentric with the central drive axis, with the drive extension extending through the central bore of the cylindrical portion, and with the cylindrical portion rotatably supporting the drive extension for rotation of the drive extension about the central drive axis;

wherein the support structure includes a hood disposed at a distal end of the support structure, and operable to engage the hose clamp, such that the hose clamp is secured between the hood of the support structure and the screw socket end of the drive extension during installation and removal operations; and a biasing device operable to bias the support structure along the central drive axis relative to the drive extension, and toward the collar.

2. The hose clamp support tool set forth in claim 1 wherein the positioning pin may be slideably disposed within any of the plurality of apertures to orient the hood of the support structure in a respective position relative to the rotational driver.

3. The hose clamp support tool set forth in claim 1 wherein the collar includes a clamp portion operable to clamp onto the nose of the rotational driver.

4. The hose clamp support tool set forth in claim 3 wherein the clamp portion includes a first half and a second half spaced from each other and compressed together.

5. The hose clamp support tool set forth in claim 4 further comprising at least one fastener connecting the first half and the second half of the clamp portion.

6. The hose clamp support tool set forth in claim 1 wherein the support structure includes a beam portion extending from the collar to the distal end, with the hood disposed at the distal end of the support structure.

7. The hose clamp support tool set forth in claim 6 further comprising a bushing disposed within the central bore and rotatably supporting the drive extension relative to the cylindrical portion of the support structure.

8. The hose clamp support tool set forth in claim 7 wherein the cylindrical portion of the support structure and the bushing are slideably moveable over the drive extension along the central drive axis.

9. The hose clamp support tool set forth in claim 8 wherein the bushing includes a bearing rotatably supporting the drive extension.

10. The hose clamp support tool set forth in claim 7 wherein the bushing includes a lip defining a radius larger than the central bore of the cylindrical portion of the support structure, wherein the lip of the bushing is disposed between the screw socket end of the drive extension and the cylindrical portion of the support structure.

11. The hose clamp support tool set forth in claim 10 wherein the biasing device is disposed between and biases against the screw socket end of the drive extension and the cylindrical portion of the support structure.

12. The hose clamp support tool set forth in claim 10 wherein the biasing device is disposed between and biases against the screw socket end of the drive extension and the lip of the bushing.

13. The hose clamp support tool set forth in claim 1 wherein the screw socket end of the drive extension includes a socket fixedly attached to the drive extension.

* * * * *